United States Patent [19]
Brun Henriksen et al.

[11] Patent Number: 6,077,433
[45] Date of Patent: Jun. 20, 2000

[54] PROCESS FOR SIMULTANEOUS EXTRACTION OF DISPERSED AND DISSOLVED HYDROCARBON CONTAMINANTS FROM WATER

[75] Inventors: Inge Brun Henriksen, Stavanger, Norway; Gary William Pace, Raleigh, N.C.

[73] Assignee: Cagniard de la Tour AS, Stavanger, Norway

[21] Appl. No.: 09/029,650

[22] PCT Filed: Feb. 28, 1997

[86] PCT No.: PCT/NO97/00060

§ 371 Date: May 13, 1998

§ 102(e) Date: May 13, 1998

[87] PCT Pub. No.: WO98/37941

PCT Pub. Date: Sep. 3, 1998

[51] Int. Cl.$^7$ .......................... B01D 11/04; B01D 17/00; B01D 17/038

[52] U.S. Cl. .......................... 210/634; 210/705; 210/708; 210/737; 210/738; 210/761; 210/774; 210/781; 210/788; 210/800; 210/804; 210/806; 210/808

[58] Field of Search .................................. 210/634, 703, 210/705, 708, 709, 737, 738, 739, 741, 742, 761, 774, 781, 787, 788, 800, 804, 806, 808, 221.2, 512.1, 512.2

[56] References Cited

U.S. PATENT DOCUMENTS

| | | |
|---|---|---|
| 4,594,164 | 6/1986 | Titmas . |
| 4,627,922 | 12/1986 | Viator et al. .............................. 210/704 |
| 4,816,165 | 3/1989 | Carrol et al. .............................. 210/788 |
| 5,298,167 | 3/1994 | Arnold .................................... 210/703 |
| 5,543,043 | 8/1996 | Bates et al. . |

FOREIGN PATENT DOCUMENTS

WO 94/13930  6/1994  WIPO .

OTHER PUBLICATIONS

De Filippi, R.P. et al., "Extraction of Organics from Aqueous Solutions Using Critical–Fluid Carbon Dioxide", *Biotechnology and Engineering Symp.* No. 12, 205–219 (1982), John Wiley & Sons, Inc.

Hadfield, O.A. et al., "Hydrocyclones in Large–Scale Marine Oil Spill Cleanup", *Offshore Technology Conference,* Houston, Texas, May 6–9, 1991, pp. 39–46.

N. Meldrum, "Hydrocyclones: A Solution to Produced Water Treatment", *Offshore Technology Conference,* Houston, Texas, Apr. 27–30, 1987, pp. 383–394.

Schubert, M.F. et al., "Liquid Hydrocyclone Separation Systems", *The Fourth International Conference on Hydrocyclones,* Southampton, 1992.

Simms, K.M. et al., "Testing of the Vortoil Deoiling Hydrocyclone Using Canadian Offshore Crude Oil", *The Fourth International Conference on Hydrocyclones,* Southampton, 1992.

Miljosok, "Oljeindustrien tar ansvar", 1996, p. 24.

Novosad, Z., "On the Aspects of Reservoir Fluids Phase Behavior Important in Design of Miscible Gas Injection Processes", *6th European IOR–Symposium,* Stavanger, Norway, May 21–23, 1991, pp. 269–276.

Roenneke, H., "A Method for the Removal of Oil from Mineral Oil Waste Water", *Erdol Zeitschrift,* 1963, Vienna.

*Primary Examiner*—David A. Reifsnyder
*Attorney, Agent, or Firm*—Young & Thompson

[57] ABSTRACT

A new process for simultaneous extraction of dispersed and dissolved hydrocarbon contaminants from water. The process is based on the principle of injecting natural hydrocarbon gas to the water feed stream under pressure and temperature conditions which permit the gas to act as a solvent for dissolved and dispersed hydrocarbon contaminants. The dispersed particles "swell" and have a reduced density which markedly improves the efficiency of the downstream separation by liquid—liquid-hydrocyclones.

18 Claims, 9 Drawing Sheets

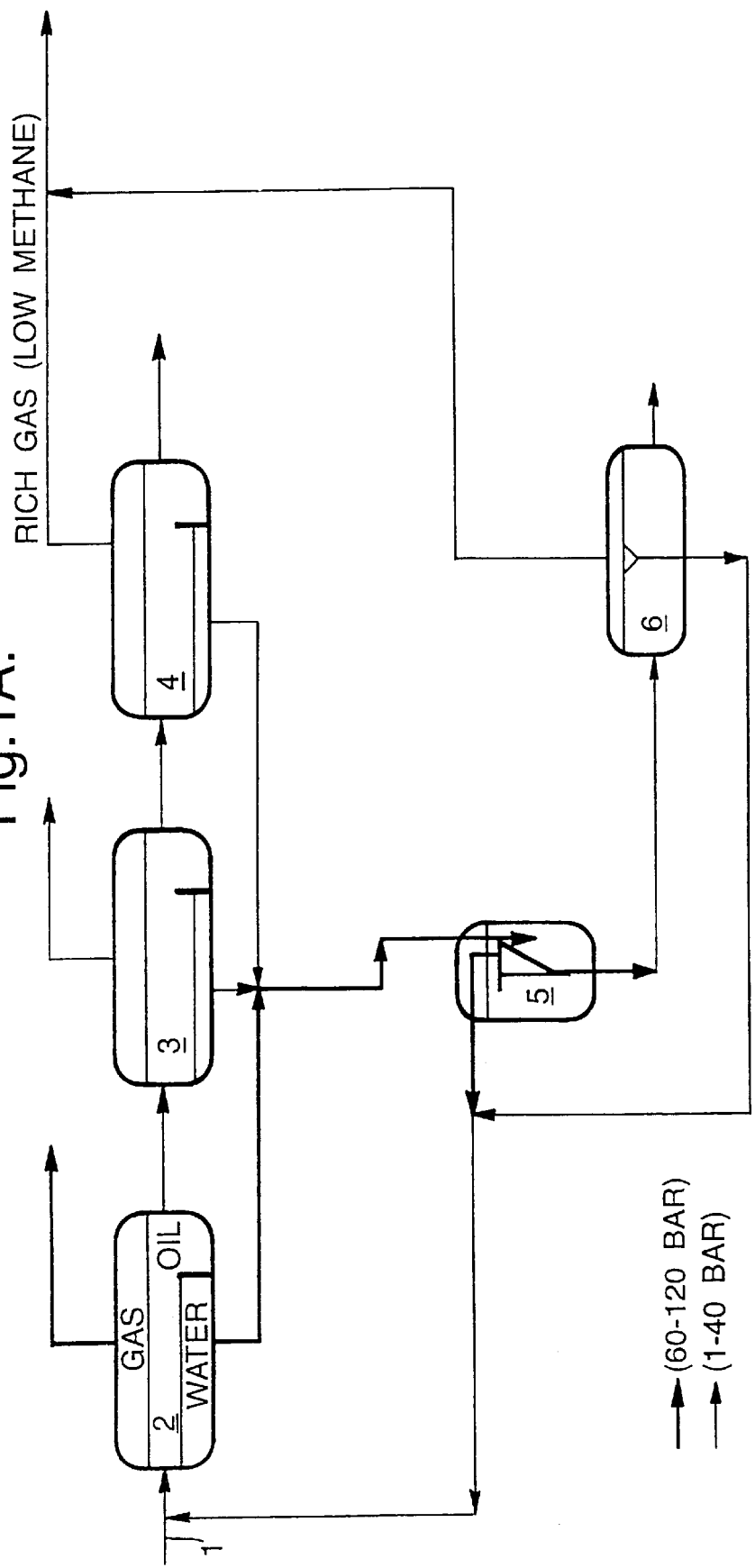

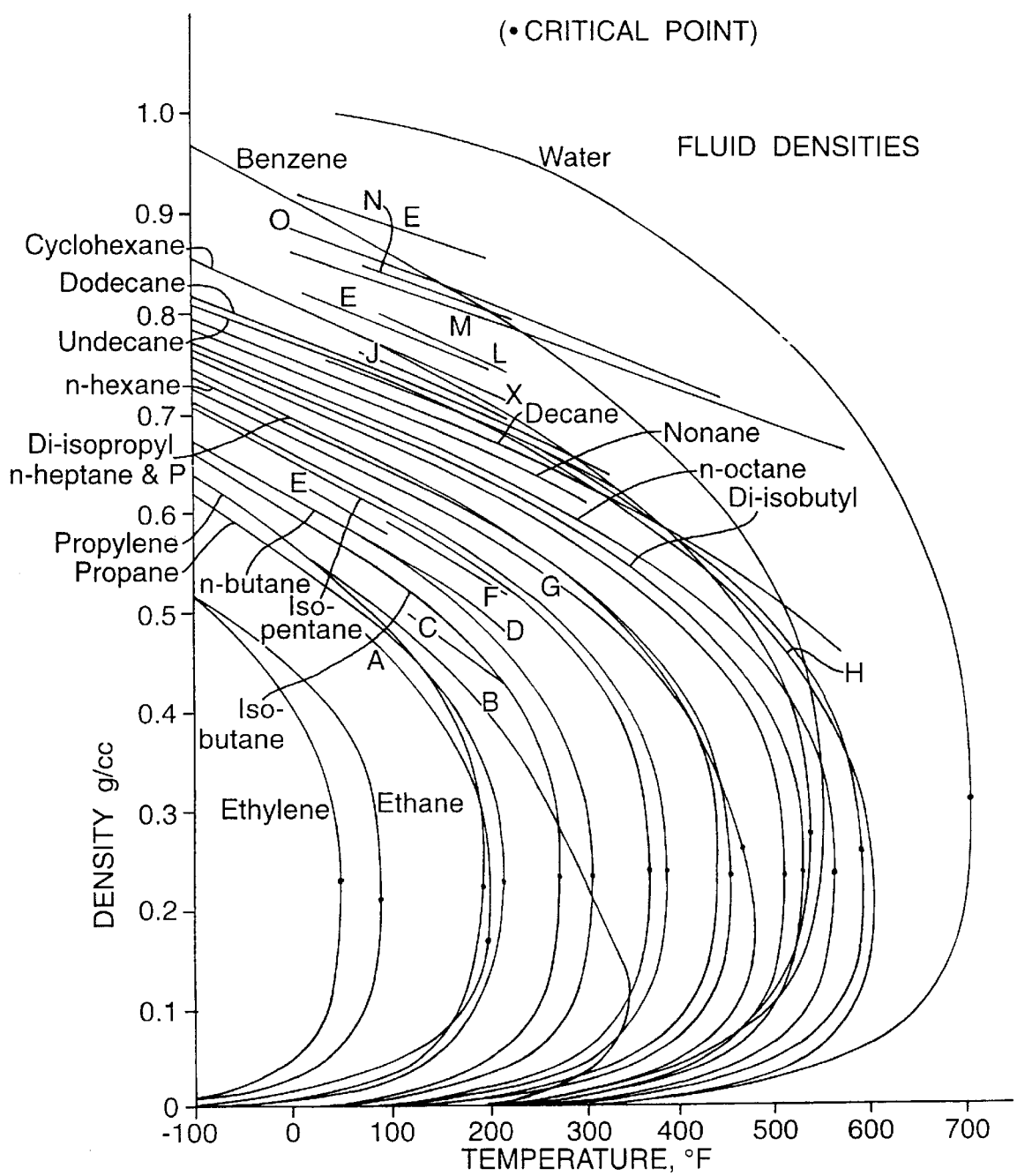

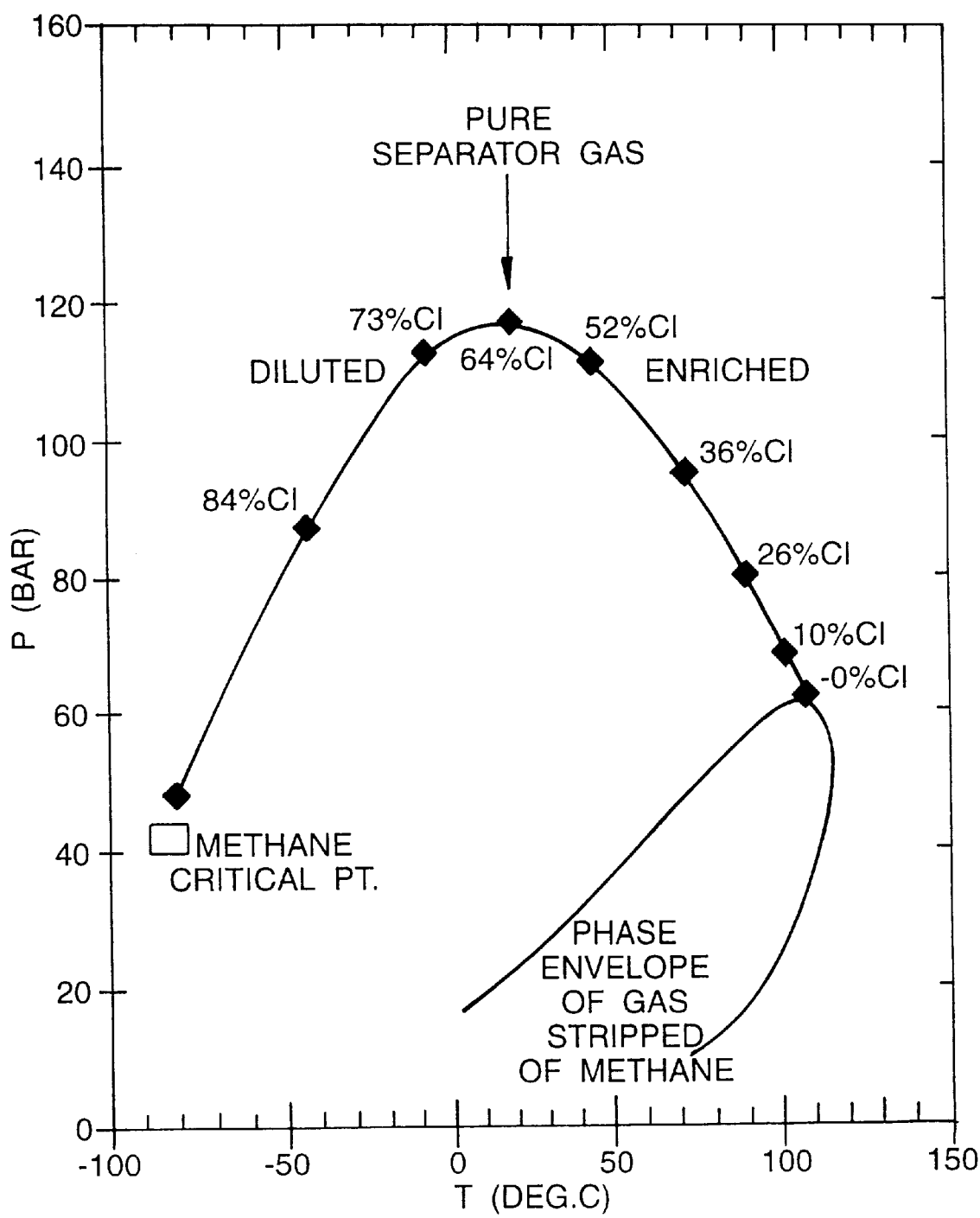

Fig.4.
PROBABILITY VOLUME DENSITY GRAPH
Name: Crude BAL/SW-P=60b   T=20-NO GAS   Median :134.90μm
                           Mean(nv): 69.39μm   Mean(um):142.98μm
Mode at 135.82μm           S.D.(nv): 49.56μm   S.D.(um) :61.56μm
                                               Conf (um) :64.14%
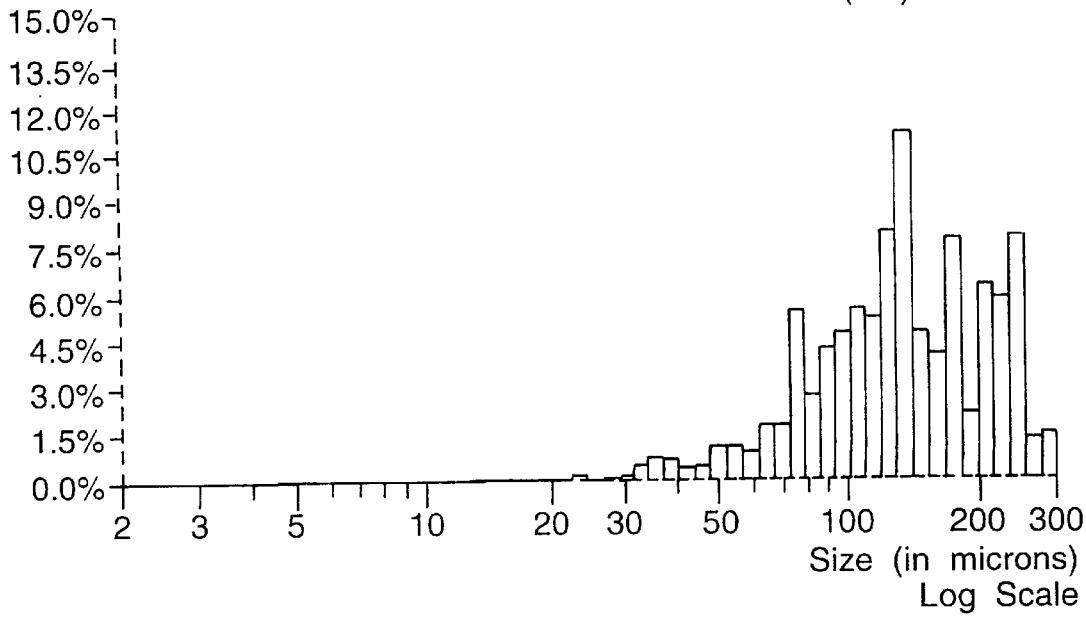
PROBABILITY VOLUME DENSITY GRAPH
Name: Crude BAL/SW-P=60b   T=20-NO GAS   Median :188.02μm
                           Mean(nv): 57.61μm   Mean(um):184.06μm
Mode at 287.98μm           S.D.(nv): 52.54μm   S.D.(um) :06.54μm
                                               Conf (um) :93.01%
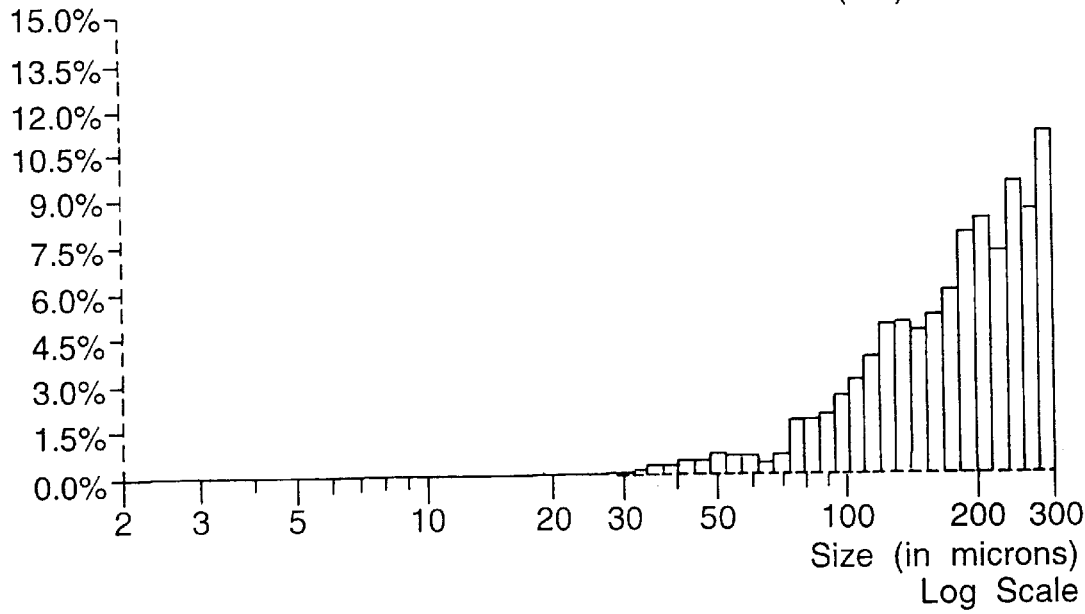

PROCESS FOR SIMULTANEOUS EXTRACTION OF DISPERSED AND DISSOLVED HYDROCARBON CONTAMINANTS FROM WATER

FIELD OF THE INVENTION

The present invention is a new process for simultanous exon of dispersed and dissolved hydrocarbon contaminants from water.

BACKGROUND OF THE INVENTION

The discharge of produced water in the Norwegian Sector of the North Sea is expected to increase from 15 Mill m$^3$ (1991) to 110 Mill m$^3$ by year 2000$_{(1)}$.

Liquid—liquid hydrocyclones are proven successful in handling increasing water production and in maintaining the current discharge limits of 40 ppm for dispersed aliphatic hydrocarbons. The average discharge concentration of dispersed oil in the Norwegian Sector has been relatively constant over the last years at approximately 20 ppm(1). However, as the existing reservoirs will be operated at higher water cuts by the year 2000, the water treatment capacity is expected to be the bottleneck in maintaining the oil production capacity for many fields in the North Sea$_{(1)}$.

There is a growing concern over the amount of aromatic compounds in the water phase, such as Benzene, Toluene and Xylene (BTX), naphtalene and PAH due to the toxic effect on the marine environment$_{(2)}$. Though no restrictions or limits to the discharge of aromatic compounds exists, it is anticipated that, when a feasible technology for its removal emerge, maximum discharge limits for aromatics will presumably follow.

In order to counter the water treatment system bottleneck, extensive research has been conducted into the improvement of the efficiency of the hydrocyclones. It has only lead to marginal improvements, some 30–40%, over the original design as proposed by Coleman and Thew in 1980$_{(3)}$. The major improvement in overall separation efficiency, has primarily resulted from process optimization upstream the hydrocyclones. The elimination of turbulent flow regimes generated by pumps and valves, have reduced oil drop break-up$_{(4)}$ and consequently improved the (downstream) separation efficiency of the hydrocyclones. The principal components governing the separation efficiency of hydrocyclones are the density difference between the continuous phase (water) and the dispersed phase (oil) and the droplet (particle) size.

When a hydrocyclone is operated at its optimum flow rate and pressure-drop, the separation efficiency can only be improved by increasing the density difference between the two phases and by minimizing droplet break-up. At normal operating conditions the density difference is given by the inherent properties of water and oil. Minimizing droplet break-up, by restricting exposure of the fluids to turbulent flow regimes, becomes a precondition for good hydrocyclone performance. This is normally achieved by housing the hydrocyclone(s) within a pressure vessel with the feed lines submerged in the liquid$_{(5)}$. At off-shore installations it is preferable to operate the hydrocyclone as close to the well head pressure as possible. This provides feed pressure, and it should be positioned upstream the level control valve of the Three Phase Separator to minimize droplet break-up, as illustrated in FIG. 1A$_{(5)}$.

Hydrocyclones is the system of choice when opened at design capacity in conjunction with a complementary flotation process at the degasser. It is, however, apparent from published data that hydrocyclones barely meet the current oil discharge limit of 40 ppm without incorporation of the downstream flotation process as provided by the degasser$_{(5)}$.

At increasing water cuts, oil production rates are dictated by the water treatment capacity of hydrocyclones and compounded negative separation effect created by reduced residence times in the 1st Stage Separator and in the degassor. Expanding current process capacities is often cost prohibitively expensive because of weight and space limitations, since the whole process train from the 1st Stage Separator to the degassor (flotation) equipment, must be adapted.

There is an apparent evolving need for technologies to increase the produced water treatment capacity and efficiency within the weight and space constraints of existing production platforms.

BRIEF DESCRIPTION OF THE DRAWINGS

The invention will be described with reference to the accompanying drawings in which:

FIG. 1A is a schematic view of the standard process,

FIG. 3 is a graph of the effect of methane on critical temperature and pressure, FIG. 4 are graphs of swelling of oil particles with and without ethane gas, FIG. 5 are graphs with relative changes in critical parameters as a function of gas-oil-ratio, FIG. 6 are graphs of residual aromatic component concentration as a function of gas-fluid volume.

DETAILED DESCRIPTION OF THE INVENTION

Figure 1B:
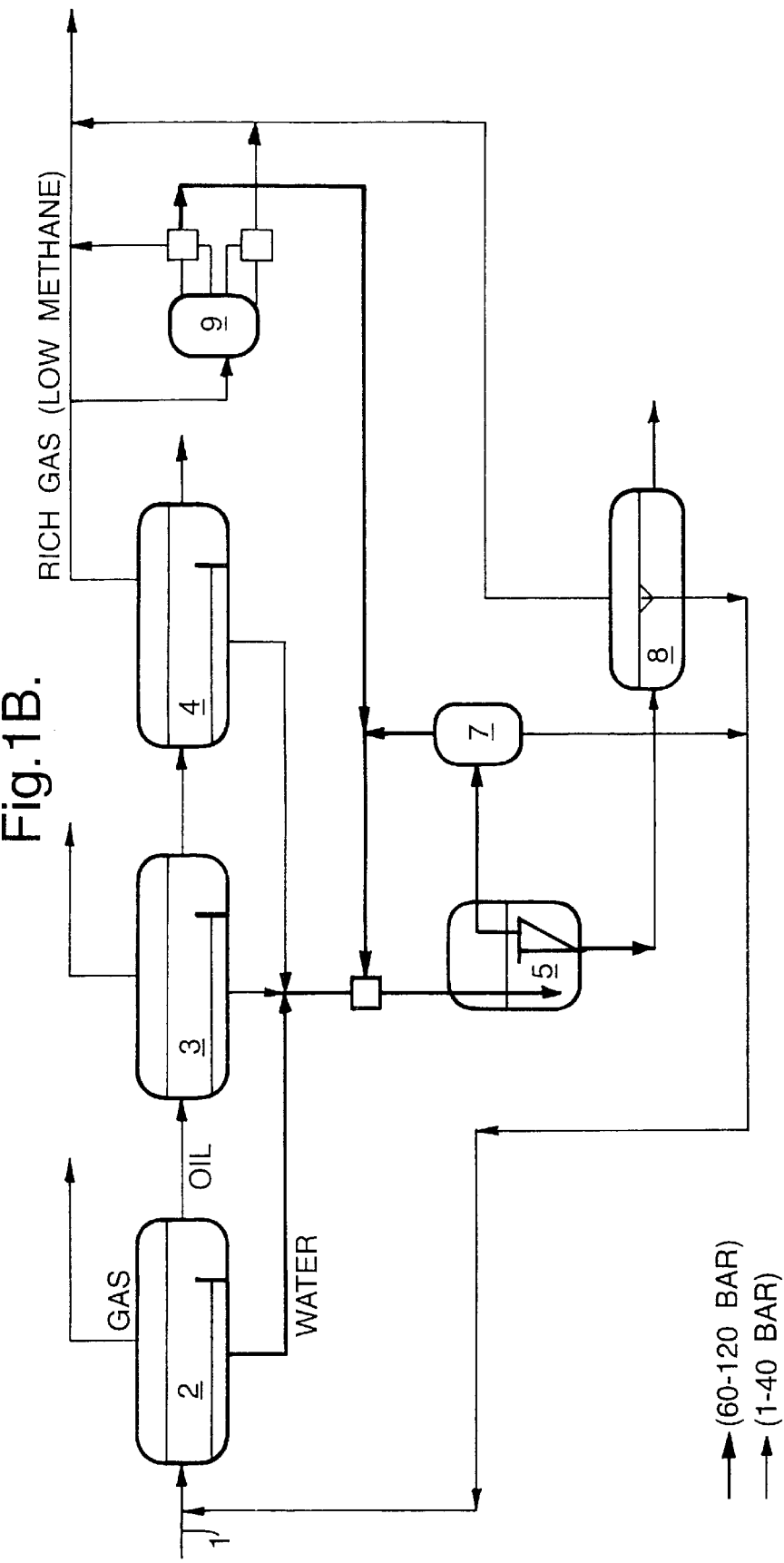
FIG. 1B is a schematic view of the new process according to present invention.

In the figures the following reference numbers are used: 1—from wellhead, 2, 3 and 4—three-phase-separators, 5—hydrocyklone, 6—flotation-degasser/mixer, 7—flash drum, 8—flotation/degasser, 9—optional gas enrichment process (reboiler), and 10—decanter.

The Standard Process

The main objective of offshore oil installations is to process the product stream from the underground reservoir into three separate streams of oil, gas and water. Each stream has to meet certain purity specifications as set by regulatory agencies and by the market. To allow overboard discharge of the water, the residual oil content has to be less than 40 ppm as discussed above. The crude oil has to be de-gassed and de-watered as illustrated in FIG. 1A. This is generally accomplished by flashing the oil stream from the wellhead (1) over three consecutive stages, at progressively lower pressure, the 1st-(2), 2nd-(3) and 3rd-Stage (4) Three-Phase-Separator. The gas composition at each stage becomes progressively richer (low in methane). The water stream from each separator is typically 10–30000 m$^3$/day and may contain 200–1000 ppm dispersed oil, 1–5 ppm BTX and less than 1 ppm of PAH-components. The water stream is driven by the wellhead pressure which could range from 30 to 100 bar with a temperature ranging from 60 to 110° C. for North Sea processes. The stream is fed into a battery of parallel hydrocyclones, (5) with a unit capacity of 6 to 12 m$^3$ per hour. The water stream from each separator is not merged as illustrated in FIG. 1A, but is normally processed individually. The oil-reject at the hydrocyclone overflow could represent 1 to 3% of the flow. The pressure drop over the hydrocyclone, inlet to reject, could range from 5 to 30 bar depending hydrocyclone geometry and flow conditions. The hydrocyclone underflow with a residual oil concentration of 10 to 100 ppm is de-pressurized and degassed in a degasser/ flotation unit. The unit (6) which is an integral unit operation in the water purification process. The individual purification steps represented by the three-phase separators, the hydrocyclones and the flotation cells are tuned such that the residual oil concentration in the water discharge (10) does not exceed a level of 40 ppm.

The New Process

With marginal process modifications to the existing systems, the following proposed process (Ref FIG. 1B) will improve the performance of standard, commercial hydrocyclones and also achieve the additional benefit of simultaneous extraction of aromatics from the water phase.

The proposed process is characterized by the utilization of natural gas to extract the organic contaminants from produced water. The resulting extract has a larger particle size and a lower density than the original dispersed oil particles. This favors a downstream gravity-separation or separation in the hydrocyclones.

This process according to the invention is based on the following criteria:

Injection of excess natural gas relative to the oil-content in the water discharge stream from the gravity separators.

The composition of the gas and the GOR (Gas-Oil-Ratio) should correspond to the formation of a single phase between the gas and the dispersed and dissolved hydrocarbons at the specific temperature- and pressure-conditions exhibited at the hydrocyclone overflow.

The gas acts as a solvent for dissolved, aromatic hydrocarbons.

The density of the dispersed particles is reduced.

The particle diameter increases.

The new process as illustrated in FIG. 1B is distinguished from the standard process in FIG. 1A in that it might require a gas enrichment process (9) depending on the properties of the available gas-condensates or separator gases. A (static) mixer is required to mix the gas-fluid into the water phase.

If a proper gas is directly available from the process, the gas-fluid could be cycled back to the oil-mainstream. Alternatively, an estimated 95–99% of the gas-fluid could be recovered at the hydrocyclones overflow for recycling. If the gas-fluid is recycled, it should be stripped for extractants in a flash drum (7) prior to eventual recycling.

Figure 1C:
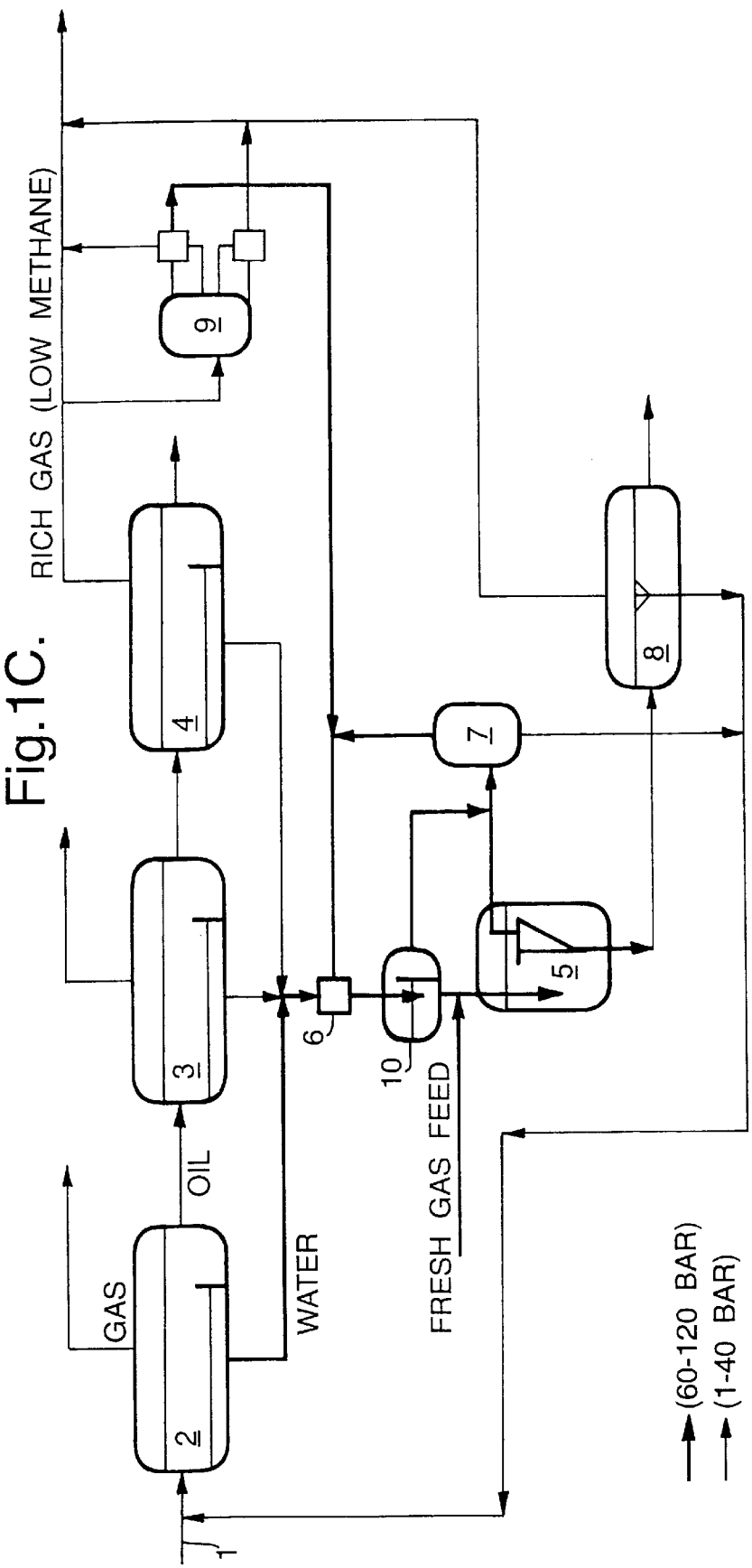
FIG. 1C is a schematic view of the new process with the decanter option.

Additional process improvements are achieved if the gas-liquid is injected in two stages as illustrated in FIG. 1C, where a majority of the gas-fluid is recovered by a gravity decanter upsteam the hydrocyclone. Additional fresh gas-fluid is subsequently injected and mixed into the hydrocyclone feed steam and recovered at the hydrocyclone overflow.

Figure 1D:
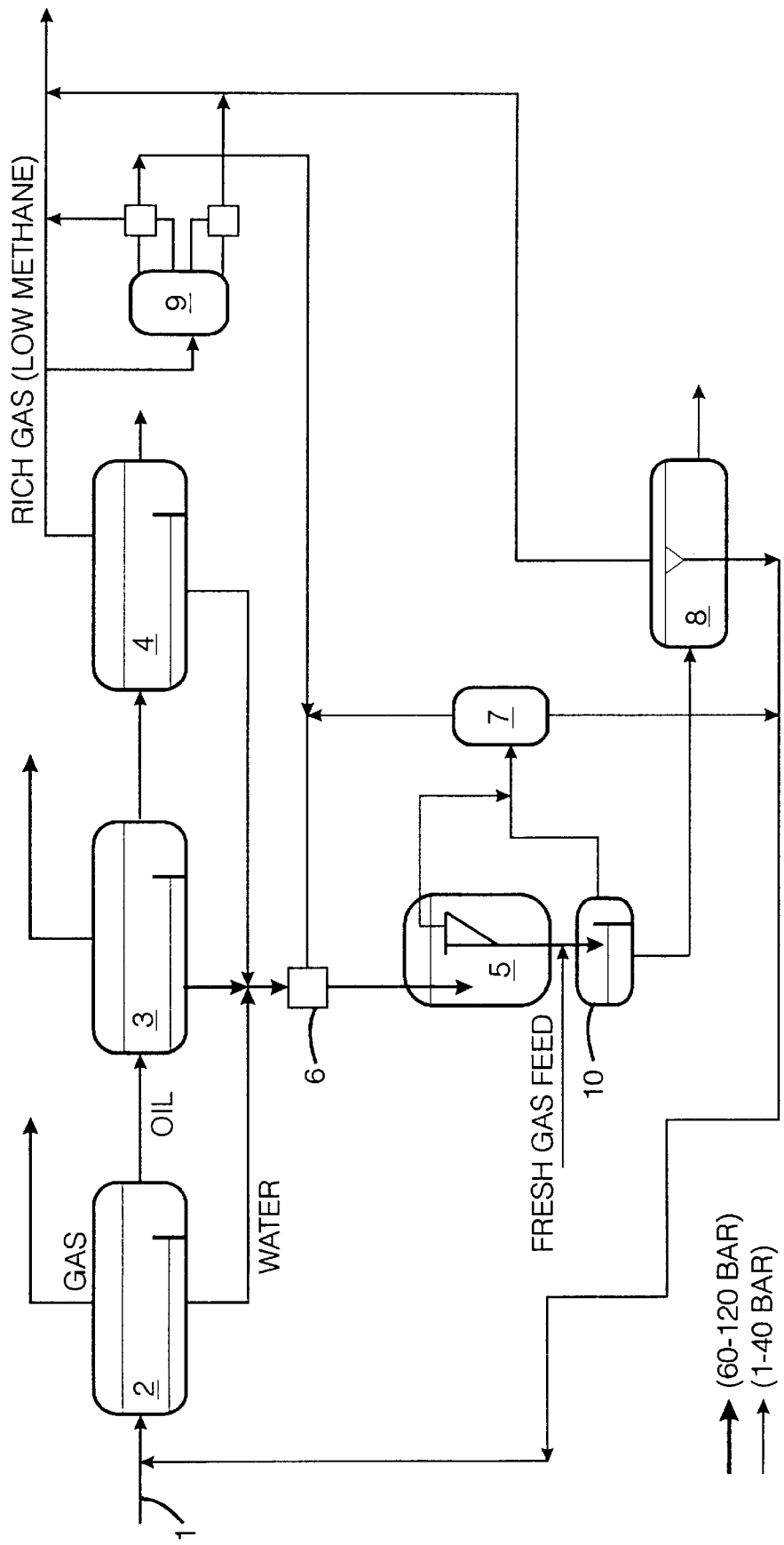
FIG. 1D is another schematic view of the new process with another decanter operation, FIG. 2 are graphs of phase behaviour as a function of density and temperature for some fluids.

Further additional process improvements are achieved if the gas-liquid is injected in two stages as illustrated in FIG. 1D where a majority of the gas-fluid is recovered by the hydrocyclone being upstream a decanter. Additional fresh gas-fluid is subsequently injected and mixed into the decanter feed stream and recovered at the decanter overflow.

This process has the advantage of a two-step extraction press which is specifically suited for enhanced extraction of dissolved aromatic components.

Numerous patents and scientific publications exist on the topics of supercritical extraction and on hydrocyclone seperation processes. However, no prior art has been identified which utilizes natural gas or multicomponent hydrocarbon gases to enhance the separation performance of liquid—liquid-hydrocyclones and/or to extract dissolved hydrocarbon contaminants from a water phase.

U.S. Pat. No. 4,594,164 and NO-Patent 167005 claim a method for separating dissolved material from a supercritical fluid by expanding the fluid over a pressure reduction valve such that the fluid goes into a two-phase region and loses its solvating power prior to entering a cyclone. The cyclone is subsequently used to harvest the precipitated solutes. This process has no resemblance to the proposed new process as presented above, in fact they are quite opposite, in that one is an extraction process performed in the one-phase-region while the other is a precipitation process performed in the two-phase-region of the fluid.

Gas Probes

The required properties are generally found near the critical point of the gas. At pressure and temperature conditions at or above the critical point, the gas exhibits both liquid- and gas-like properties, posessing the solvating power of an organic solvent and the viscosity and diffusivity of a gas. The density of aliphatic hydrocarbon compounds at the critical point is approximately 0.25 at the critical point, as illustrated in FIG. 2.

The critical point of a multicomponent hydrocarbon mixture is greatly influenced by the composition and is very sensitive to the concentration of "lean" components, such as methane and nitrogen. A high consentration of "lean" components tends to bring the critical point of the mixture towards both unfavorable sub-zero temperatures and high pressures.

The fundamental principles governing miscibility between oil and gases are well established and are used routinely by the oil industry in PCT-labs and also for improved oil recovery gas gas flooding of reservoirs$_{(7)}$.

Figure 5:
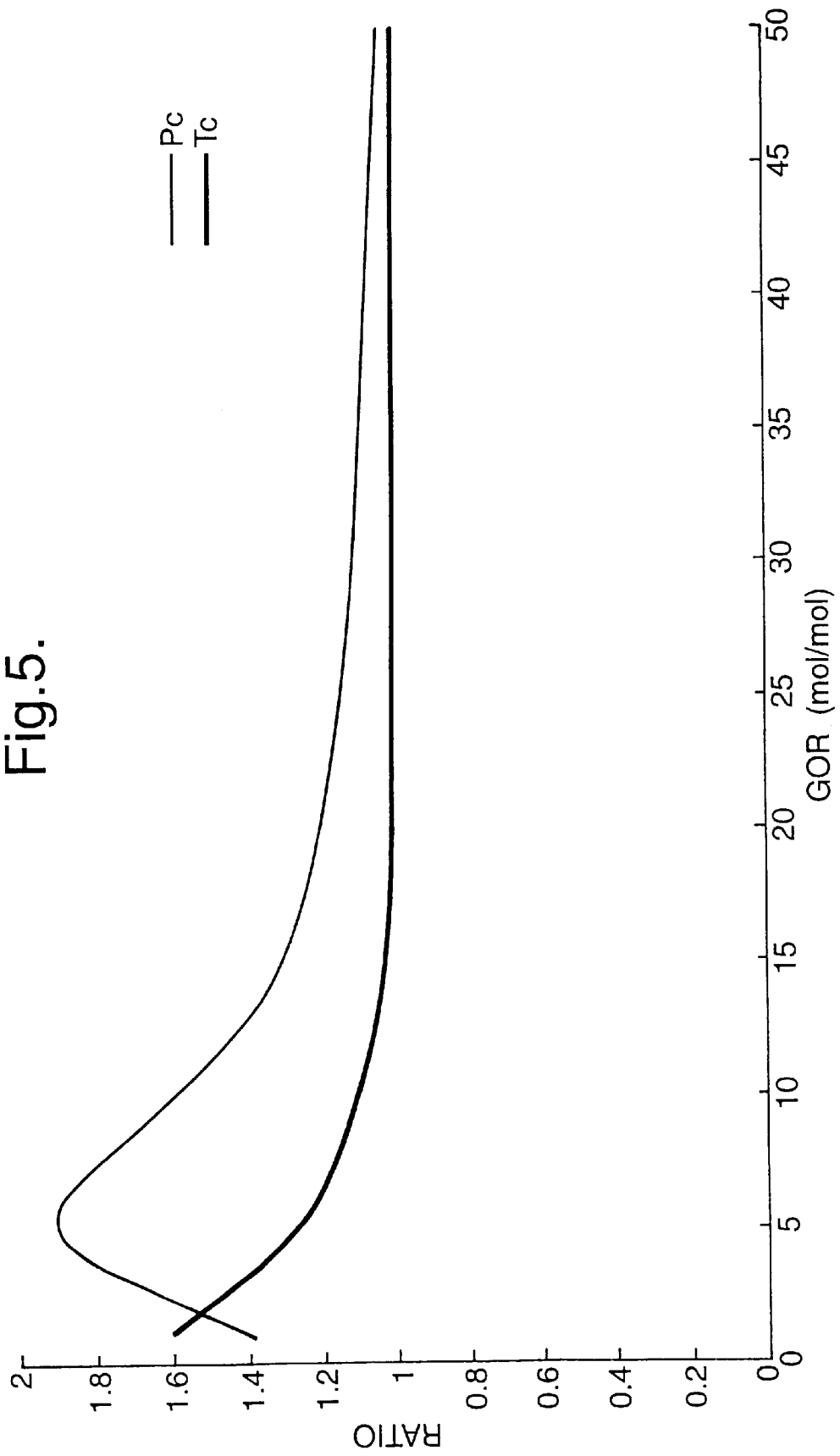

Algorithms for the prediction of the critical point, phase behavior and miscibility parameters of oil and gas mixtures are available. Several commercial computerized systems for the calculation of these parameters are available to the oil industry. All results presented in FIGS. 3 and 5 are derived from a computerized PVT-simulation based on the Peng-Robinson Equation of Stat (EOS).

The conditions yielding the lowest fluid density for increased hydrocyclone efficiency, is found close to the critical point, outside the phase envelope, the conditions for best extraction efficiency of aromatic components is exhibited in the one-phase-region, often referred to as the "near critical region", where T=85–97% Tc and P>90% Pc. (T expressed in °K. and Pc and Tc represent the respective conditions at the critical point).

In the following the term "gas-fluid" is used for gas which meets these criteria.

The most sensitive parameter influencing the successful application of the process is the composition of the gas-fluid. The composition of the 1st Stage Separator-Gas of most North Sea reservoirs are generally high in methane (75 to 85 Mol %) which will require sub-zero temperatures to achieve full miscibility between the gas-fluid and oil fractions. The gas is generally enriched in the 2nd and 3rd Stage-Separator. The effect of methane on the critical parameters for a 12-component, 2nd Stage Separator-Gas is illustrated in FIG. 3. It is apparent from FIG. 3 that some degree of enrichment (methane stripping) of the gas is required in order to be in the one-phase, near-critical region at the specific temperature and pressure of produced water, which is typically 30–100 bar and 60–110° C. for North Sea processes.

The appropriate processes for methane stripping (gas enrichment), such as distillation and/or flashing, are well established and easily implemented by those skilled in the art.

EXAMPLE 1
Hydrocyclone Performance

If the produced water is at, say 80° C. and 75 bar, it is apparent from FIG. 3 that this particular gas has to be enriched to approximately 10% methane to yield a critical point of say 60 bar and 100° C. This will allow for a 15 bar pressure drop in the hydrocyclone overflow and consequently prevent the formation of two-phases (gas-bubbling) at the overflow.

In order to maintain one single phase when the dispersed oil and the gas-fluid are intermixed, an excess of gas-fluid is required. This is illustrated in FIG. 5 where the resulting changes in critical temperature and pressure, expressed relative to the critical values of the original gas, is plotted against the molar gas-oil-ratio (GOR). It is apparent from FIG. 5 that a low GOR will result in a dramatic increase in the temperature and pressure requirements in order for the recombined fluid to stay in the one-phase region. At higher GOR's the pressure and temperature will approach the critical value for the pure gas-fluid, as it was before it was recombined with the oil. For practical purposes, a GOR in excess of 25 seems feasible.

A material balance based on a GOR of 25 will result in a gas requirement of 3.3 St. $m^3$ gas per kg dispersed oil. In practical terms, 3.3 St. $m^3$ gas is required per $m^3$ produced water if the residual oil level is 1000 ppm in the water stream fed from the upstream separator.

Recycling a fraction of the gas-fluid will reduce the feed requirement accordingly.

An estimate of the potential improvement in hydrocyclone separation efficiency indicates that the increased density difference alone contributes with up to 350% improvement in particle cut-off (migration probability), as determined by the algorithms presented by Coleman and Thew$_{(3)}$. Additional capacity benefits are achieved because the gas-fluid "swells" the dispersed oil particles. Bench test have indicated that the oil particles coalless with "gas-fluid-particles". For a GOR of 25, the resulting new particles has a density which approaches the density of the gas-fluid of approximately 0.3–0.5 $g/cm^3$ depending on the temperature and pressure conditions and also a double diameter as illustrated in FIG. 4. The particle distribution as illustrated in FIG. 4 is determined by a Gallay-instrument (laser detraction) at 60 bar and 20° C., utilizing ethane as "gas-fluid" to swell the oil particles. It should be noted that the analytical range of the Gallay-instrument is 3–300 micrometer, hence part of the distribution curve fell outside this range when the oil particles were exposed to the ethane-fluid.

Stoke's Law states that the sedimentation rate is proportional to the density difference between the dispersed and coninous phase and to the square of the particle diameter. Assuming Stoke's Law applies, the overall effect of the introduction of a gas-fluid is to increase the sedimentation rate by a factor up to 14 as compared to a standard process. Such improvements in sedimentation rates will markedly improve the efficiency of hydrocyclones.

The eventual introduction of a gas-fluid in the gravity (decanter) separation upstream the hydrocyclones as illustrated in FIG. 1C, will reduce the feed oil concentration to the hydrocyclones which will yield further improvements, since it is well recognized that a low oil concentration in the feed generally results in lower oil discharge concentrations (8,9).

EXAMPLE 2
Extraction of Aromatic Components

The conditions for optimum extraction of the aromatic components is determined by the respect components solubility ratio at equilibrium (K-value) and by the respective mass transfer rates of the components from the water and into the gas-fluid phase.

K-values for a series of aromatic components, expressed as $m^3$ Water per Standard $m^3$ gas ($m^3$/St $m^3$) at 75 bar and 70° C., are listed in Table 1 for a propane-water mixture. The data are derived by utilizing the thermodynamic simulator, PROII, from Simulation Sciences Inc. (U.S.A.).

TABLE 1

K-values (water/propane) for Aromatic Components at 75 bar and 70° C.

| Component | K-value ($m^3$/St $m^3$) |
|---|---|
| Benzene | 0.66 |
| Toluene | 1.53 |
| Xylene | 3.80 |
| Biphenyl | 4.52 |
| Antracene | 27.50 |
| Pyrene | 24.75 |
| Naphtalene | 29.12 |
| Phenantrene | 27.50 |

The K-values of Table 1 were used to calculate the extraction efficiency as a function of gas flow by performing a simple material balance at equilibrium. The results are illustrated in FIG. 6.

Figure 6:
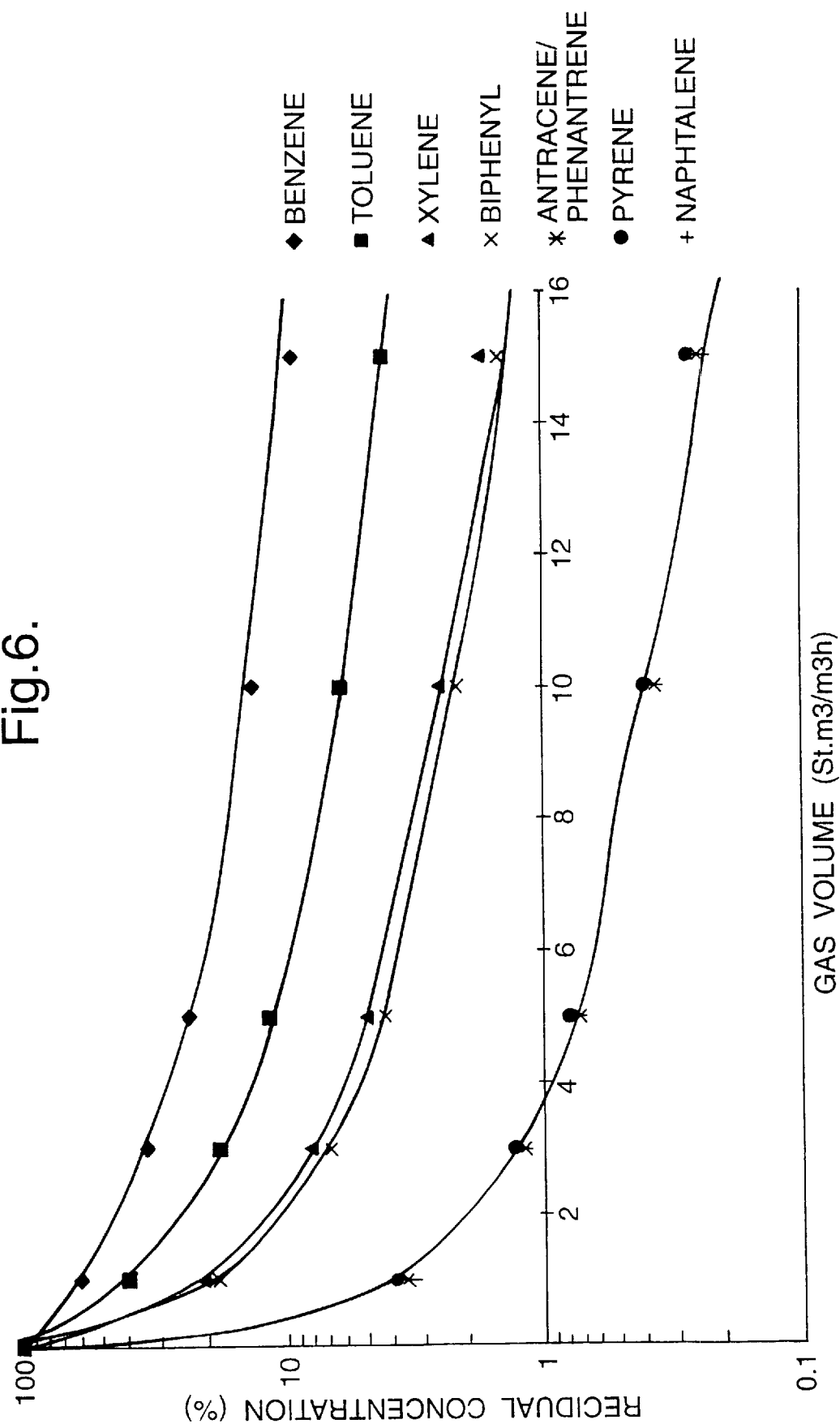

FIG. 6 illustrates the extraction efficiency, at one equilibrium stage, of the respective aromatic components in Table 1, as a function of gas flow. It is apparent from FIG. 6 that a gas flow of 3.3 St $m^2/m^3$ as determined for "swelling" of dispersed hydrocarbons in Example 1 above, will also extract up to 99% of the polyaromatic components (PAH) (antrasene, pyrene, phenantrene and naphtalene) and also a significant, but lesser amount of the lighter aromatic components such as biphenyl, xylene, toluene and benzene.

It should be noted that the above extraction efficiencies are the result of a one stage extraction of dissolved aromatic components. This extraction is performed simultaneously with the proposed "swelling" of dispersed oil particles which yields improvement in hydrocyclones performance.

An eventual increase in efficiency beyond the yield of a one-stage extraction, could be achieved by conducting a decanter extraction upstream the hydrocyclone as illustrated in FIG. 1C, followed by the injection and mixing of a fresh gas-liquid into the water, prior to entering the hydrocyclone.

REFERENCES

1 OLF Miljøprogram (environmental program), Rapport phase 1, secton B: "Utslipp til Sjø" (1991)
2 Somerville et al: "Environmental Effects of Produced Water from North Sea oil operations", Mar. Poll. Bul. 18, 10 (1987) 549–558
3 Coleman D. A., Thew M. T. and Comey D. R: "Hydroyclones for oil/water Separation", International Conference on Hydrocyclones, Cambridge UK (1980)

4 Meldrum N.: "Hydrocyclones: A Solution to Produced Water Treatment", OTC, Houston, Tex. #5594, 383–394 (1987)

5 Schubert M. F., Skilbeck F. and Walter H. J.: "Liquid Hydrocyclones Separation Systems", The 4th International Conference on Hydrocyclones, Southhampton, (1992)

6 De Filippi R. P. and Moses J. M.: "Extraction of Organics from Aqueous Solutions Using Critical-Fluid Carbon Dioxide", Biotechnology and Engineering Symp. No 12, 205–219 (1982)

7 Novasad Z.: "On the Aspects of Reservoir Fluid Phase Behavior Important in Design of Miscible Gas Injection Processes", 6th IOR Symposium, Stavanger, Norway, 269–276 (1991)

8 Hadfield D. A. and Riibe S.: "Hydrocyclones in Large-Scale Marine Spill Cleanup", OTC #6504, Houston, Tex, 39–46 (1991)

9 Simms K. M. et al: "Testing the Vortoil Deoiling Hydrocyclone Using Canadian offshore Crude Oil", The 4th International Conference on Hydrocyclones, Southampton, (1992)

What is claimed is:

1. A method of separating dissolved and dispersed hydrocarbon contaminants from hydrocarbon-contaminated water, which method comprises the steps of: mixing into a stream of hydrocarbon-contaminated water a liquid hydrocarbon gas; allowing said water and said liquid hydrocarbon gas to separate in a liquid—liquid separator; and removing from said separator an aqueous liquid and a hydrocarbon liquid, said aqueous liquid being more dense than said hydrocarbon liquid; said method further comprising maintaining said water and said liquid hydrocarbon gas within said separator at a temperature and a pressure at which said liquid hydrocarbon gas and hydrocarbon contaminants in said hydrocarbon-contaminated water are miscible and at which said liquid hydrocarbon gas remains liquid, whereby said hydrocarbon liquid is a single phase comprising said liquid hydrocarbon gas and said hydrocarbon contaminants.

2. A method as claimed in claim 1 wherein said liquid hydrocarbon gas comprises a mixture of hydrocarbons.

3. A method as claimed in claim 1 wherein said liquid hydrocarbon gas has an average molecular weight of from 30 to 72 g/mole.

4. A method as claimed in claim 1 wherein said liquid hydrocarbon gas is Natural Gas Liquid.

5. A method as claimed in claim 1 wherein said liquid hydrocarbon gas comprises less than 64 mole % methane.

6. A method as claimed in claim 1 wherein said liquid hydrocarbon gas is mixed with said hydrocarbon-contaminated water stream in an amount of at least 3.3 St $m^3$ liquid hydrocarbon gas/$m^3$ hydrocarbon-contaminated water.

7. A method as claimed in claim 1 wherein said liquid hydrocarbon gas is mixed with said hydrocarbon-contaminated water stream in an amount of at least 3.3 St $m^3$ liquid hydrocarbon gas/kg contaminant.

8. A method as claimed in claim 1 wherein said liquid hydrocarbon gas is mixed with said hydrocarbon-contaminated water stream in an amount of at least 25 moles liquid hydrocarbon gas per mole contaminant.

9. A method as claimed in claim 1 wherein said hydrocarbon-contaminated water stream has a temperature of 60 to 110° C.

10. A method as claimed in claim 9 wherein said hydrocarbon-contaminated water stream has a pressure of 30 to 100 bar.

11. A method as claimed in claim 1 wherein said separator is a hydrocyclone.

12. A method as claimed in claim 1 wherein said separator is a gravity separator.

13. A method as claimed in claim 1 wherein the steps of said method are repeated using the initial aqueous liquid as said stream of hydrocarbon-contaminated water for the repetition.

14. A method as claimed in claim 13 wherein the separator initially used is a gravity separator and the separator subsequently used is a hydrocyclone.

15. A method as claimed in claim 13 wherein the separator initially used is a hydrocyclone and the separator subsequently used is a gravity separator.

16. A method as claimed in claim 1 wherein said hydrocarbon-contaminated water is produced water.

17. A method as claimed in claim 1 wherein said stream of hydrocarbon-contaminated water and said liquid hydrocarbon gas both derive from the product stream of an underground oil reservoir which is separated into gas, oil and water streams, said stream of hydrocarbon-contaminated water deriving from said water stream and said liquid hydrocarbon gas being obtained from said gas stream.

18. A method as claimed in claim 17 wherein gas from said gas stream is depleted in methane in the production of said liquid hydrocarbon gas.

* * * * *